US00RE40304E

(19) United States
(12) Reissued Patent
Kopras et al.

(10) Patent Number: US RE40,304 E
(45) Date of Reissued Patent: May 6, 2008

(54) ANGLE ATTACHMENT FOR POWER TOOL

(75) Inventors: Robert K. Kopras, Black Earth, WI (US); James Stanley, Willowbrook, IL (US)

(73) Assignee: Robert Bosch GmbH, Stuttgart (DE)

(21) Appl. No.: 10/120,227

(22) Filed: Apr. 11, 2002

Related U.S. Patent Documents

Reissue of:
(64) Patent No.: 6,048,260
Issued: Apr. 11, 2000
Appl. No.: 09/346,158
Filed: Jul. 1, 1999

(51) Int. Cl.
*B24B 27/08* (2006.01)
*B27C 1/00* (2006.01)
*B23C 1/20* (2006.01)

(52) U.S. Cl. ..... 451/358; 451/459; 144/154.5; 409/182

(58) Field of Classification Search ..... 144/136.95, 144/137, 154.5; 409/175, 181, 182; 408/241 R; 173/216
See application file for complete search history.

(56) References Cited

U.S. PATENT DOCUMENTS

| | | | | |
|---|---|---|---|---|
| 2,155,082 A | | 4/1939 | Decker | |
| 2,517,910 A | | 8/1950 | Miller | |
| 2,553,688 A | | 5/1951 | Thompson | |
| 2,780,942 A | | 2/1957 | Babcock | |
| 2,900,856 A | | 8/1959 | Maier | |
| 3,574,374 A | | 4/1971 | Keller et al. | |
| 3,597,883 A | | 8/1971 | Choplin et al. | |
| 3,901,098 A | | 8/1975 | Jinkins | |
| 4,060,940 A | * | 12/1977 | DeWitt | 451/358 |
| 4,332,147 A | | 6/1982 | Grech | |
| 5,005,321 A | * | 4/1991 | Barth et al. | 451/359 |

(Continued)

FOREIGN PATENT DOCUMENTS

| | | |
|---|---|---|
| DE | 947 270 | 8/1956 |
| DE | 2 300 120 | 1/1973 |
| DE | 27 42 062 B2 | 9/1977 |
| DE | 3212021 A1 | 3/1982 |
| DE | 4326652 A1 | 9/1993 |
| DE | 43 26 652 A1 | 1/1994 |
| EP | 0 405 132 B1 | 7/1994 |
| EP | 1 129 825 A2 | 5/2001 |

OTHER PUBLICATIONS

Office Action from European Patent Office for Application No. 00 939 793.6, dated Mar. 14, 2006, 4 pages.

*Primary Examiner*—Shelley M. Self

(57) ABSTRACT

An angle attachment of a hand-held power tool, such as a spiral cutting tool, includes an angle attachment housing having an open first end adapted to be attached to the motor housing of the power tool. An alignment bearing is mounted in the angle attachment housing and adapted to receive and support a first shaft having a first shaft gear mounted thereon. An attachment shaft is mounted in the angle attachment housing at an angle, e.g., a right angle, to the first shaft. The attachment shaft includes an attachment shaft gear mounted thereon which is engaged with the first shaft gear. One or more attachment shaft bearings are mounted in the angle attachment housing to support the attachment shaft for rotational movement thereof. The first shaft is coupled to a motor shaft of the power tool before the angle attachment housing is attached to the power tool motor housing. Rotation of the first shaft by the power tool motor causes rotation of attachments attached to the attachment shaft mounted at an angle to the first shaft by means of the gear mechanism formed by the engaged first shaft gear and attachment shaft gear.

36 Claims, 6 Drawing Sheets

U.S. PATENT DOCUMENTS 5,052,496 A 10/1991 Albert et al.
5,201,146 A * 4/1993 Fushiya ..... 451/358
5,601,483 A * 2/1997 Rudolf et al. ..... 451/359
5,709,136 A 1/1998 Frenkel
5,718,621 A * 2/1998 Turley ..... 451/342
5,813,805 A * 9/1998 Kopras ..... 408/241 R
5,863,159 A 1/1999 Lasko
5,902,080 A * 5/1999 Kopras ..... 409/182
6,089,331 A 7/2000 Christ
6,325,127 B1 12/2001 Waldrop
6,352,127 B1 3/2002 Yorde

* cited by examiner

ANGLE ATTACHMENT FOR POWER TOOL

Matter enclosed in heavy brackets [ ] appears in the original patent but forms no part of this reissue specification; matter printed in italics indicates the additions made by reissue.

FIELD OF THE INVENTION

This invention pertains generally to hand-held power tools such as spiral cutting tools, and more particularly to cutting, sanding, and other accessories and/or attachments for such power tools.

BACKGROUND OF THE INVENTION

A spiral cutting tool is a hand-held power tool having an electric motor that rotates a spiral cutting tool bit at very high speeds. A typical spiral cutting tool includes an electric motor enclosed within a generally cylindrical motor housing. The motor drives a motor shaft which extends from one end of the motor housing along the axis thereof. A mechanical structure, such as a conventional drill-type chuck or a collet-type system, is mounted on the end of the motor shaft outside of the motor housing, for attaching, e.g., a spiral cutting tool bit to the motor shaft. The spiral cutting tool bit is designed for cutting perpendicular to the axis of the bit. A spiral cutting tool is thus used to remove material from a work piece by moving the rotating spiral cutting tool bit through the work piece in a direction perpendicular to the axis of rotation of the bit. Thus, a spiral cutting tool is conventionally operated by grasping the motor housing with one or both hands, and/or grasping a handle attached to the motor housing, turning on the electric motor to begin high speed rotation of the spiral cutting tool bit, plunging the spinning cutting tool bit into a work piece, such as a piece of wood, and then moving the cutting bit through the work piece in a direction perpendicular to the axis of the spiral cutting tool bit by moving the motor housing in a direction parallel to the plane of the work piece surface while keeping the axis of the motor housing generally perpendicular to the work piece surface.

The utility of a spiral cutting tool may be enhanced by attaching accessories other than spiral cutting tool bits to the motor shaft extending from the spiral cutting tool housing, to be rotated by the high-speed spiral cutting tool motor within the housing. For example, a cutting wheel or sanding disk might be attached to the spiral cutting tool motor shaft to be driven by the high-speed spiral cutting tool motor. The use of such attachments might expand the utility of the spiral cutting tool to various other cutting and sanding operations. However, the utility of a spiral cutting tool for such operations is limited if the cutting wheel or sanding disk is attached directly to the end of the motor shaft extending from the end of the motor housing. In such a case, the orientation of the cutting wheel or sanding disk with respect to the motor housing prevents effective use of the spiral cutting tool for cutting wheel and sanding operations, due to limited control and visibility.

What is desired, therefore, is an attachment for a spiral cutting tool, or other hand-held power tool, which allows cutting wheels, sanding disks, and similar attachments to be coupled to the spiral cutting tool motor, to be driven thereby, in a useful orientation with respect to the cutting tool motor housing. Such an attachment is preferably removably attachable to the spiral cutting tool, so that the spiral cutting tool or other hand-held power tool may be converted easily for use in wheel cutting or sanding operations, and re-converted back for use with, e.g., spiral cutting tool bits, etc.

SUMMARY OF THE INVENTION

The present invention provides an angle attachment for spiral cutting tools and other similar hand-held power tools. An angle attachment in accordance with the present invention may be removably coupled to the motor shaft of a spiral cutting tool or other hand-held power tool, and transfers the rotational motion of the motor shaft of the tool to an attachment shaft mounted at an angle, for example, at a right angle, to the motor shaft. Attachments, such as a cutting wheel or a back-up pad having a sanding disk mounted thereon, may be attached to the attachment shaft, and rotated thereby at a high speed by the spiral cutting tool motor via the angle attachment. An angle attachment in accordance with the present invention thus enhances the utility of a spiral cutting tool or similar hand-held power tool by allowing such a tool to be used to drive cutting wheels, sanding disks, and similar attachments in a useful orientation with respect to the spiral cutting tool housing such that visibility and control are not compromised.

An angle attachment in accordance with the present invention includes an angle attachment housing, in which the other components of the angle attachment are positioned and mounted. The angle attachment housing may be made of a sturdy rigid material, such as hard plastic or metal. The angle attachment housing preferably includes a structure for attaching the angle attachment housing to the motor housing of a spiral cutting tool or other similar hand-held power tool. Such a structure may include, for example, one or more slots formed adjacent to an open first end of the angle attachment housing, which allow the open first end of the angle attachment housing to expand slightly. This allows the open first end of the angle attachment housing to be positioned over and around an end of a spiral cutting motor tool housing, around the location where a motor shaft emerges from the housing. One or more screws, bolts, or other fasteners are preferably mounted on the first end of the angle attachment housing, and extend across the slots formed therein. After positioning the first end of the angle attachment housing on the cutting tool motor housing, the fasteners are tightened, thereby drawing portions of the angle attachment housing on either side of the slots together, to secure the first end of the angle attachment housing to the cutting tool motor housing.

A gear mechanism is positioned in the angle attachment housing for transferring the rotational motion of the cutting tool motor shaft driven by the cutting tool motor to an attachment shaft mounted at an angle, e.g., a right angle, thereto. A first shaft positioned in the angle attachment housing is removably attachable to an end of the cutting tool motor shaft extending from the cutting tool housing, via a mechanical structure, such as a collet-type system, mounted on the end of the motor shaft. A first shaft gear is mounted on the first shaft, such that when the first shaft is rotated by the cutting tool motor shaft, the first shaft gear is also rotated. The first shaft is supported in the angle attachment housing by an alignment bearing assembly mounted therein. For example, a distal end of the first shaft is preferably inserted into a central aperture of the alignment bearing assembly mounted in the angle attachment housing.

An attachment shaft is mounted in the angle attachment housing at an angle, such as a right angle, to the first shaft which is attached to the cutting tool motor shaft. An attachment shaft gear is mounted on the attachment shaft. The attachment shaft gear is positioned on the attachment shaft such that the attachment shaft gear engages the first shaft gear mounted on the first shaft when the first shaft is positioned in the angle attachment housing to be supported by the alignment bearing. Thus, rotation of the first shaft attached to the cutting tool motor shaft causes rotation of the attachment shaft, mounted at an angle thereto, via the gear mechanism formed by the first shaft gear mounted on the first shaft and the attachment shaft gear mounted on the attachment shaft. The attachment shaft is supported for rotational movement in the angle attachment housing via one or more attachment shaft bearing assemblies mounted therein. Preferably at least two attachment shaft bearing assemblies are employed. Two attachment shaft bearing assemblies mounted in the angle attachment housing to support the attachment shaft on either side of the attachment shaft gear are preferred.

To attach an angle attachment in accordance with the present invention to a spiral cutting tool, or other hand-held power tool, the first shaft is attached to the end of the tool motor shaft by the collet-type system or other mounting structure provided thereon. The first shaft is then positioned in the motor housing. Hand-held power tools, and especially spiral cutting tools, employ very high-speed motors. For example, a spiral cutting tool may employ an AC electric motor with a no-load rotation speed of 30,000 RPM. Thus, the first shaft and attachment shaft of an angle attachment in accordance with the present invention may be driven at very high speeds. Particularly at such high speeds, it is critical that the relative positions of the first shaft and the attachment shaft be established properly and maintained to prevent slipping of the gear mechanism formed by the first shaft gear and the attachment shaft gear. The use of an alignment bearing assembly mounted in a fixed position in the angle attachment housing ensures that the first shaft is properly positioned and oriented in the angle attachment housing with respect to the attachment shaft, such that the gear mechanism formed by the gears mounted on the first shaft and the attachment shaft is properly established and maintained. Thus, even though the first shaft is removable from and insertable into the attachment housing by a user, the alignment bearing is mounted in the attachment housing in a fixed position in relation to the attachment shaft mounted in the attachment housing, and the attachment shaft gear mounted thereto. Thus, proper engagement of the first shaft gear and the attachment shaft gear is established and maintained when the first shaft is positioned in the angle attachment housing by, for example, inserting the distal end of the first shaft into the central aperture of the alignment bearing assembly.

Various attachments may be attached to the attachment shaft by, for example, an attachment mounting structure formed at an end of the attachment shaft extending from a second end of the angle attachment housing. For example, an attachment flange may be mounted on the end of the attachment shaft extending from the angle attachment housing, with a portion of the attachment shaft extending distally beyond the attachment flange being threaded. An attachment to be driven by the attachment shaft, such as, for example, a cutting wheel, may be mounted on the attachment shaft by, for example, placing the cutting wheel against the attachment flange, with the threaded portion of the attachment shaft extending through a central aperture formed in the cutting wheel, threading a flange nut over the threaded portion of the attachment shaft, and tightening the flange nut down against the cutting wheel to press the cutting wheel tightly against the attachment flange, to thereby attach the cutting wheel securely to the attachment shaft. Alternatively, an attachment, such as a back-up pad, upon which sanding disks may be mounted, may be mounted on the end of the attachment shaft by simply threading the attachment onto the threaded end of the attachment shaft until the attachment rests tightly against the attachment shaft flange.

An angle attachment in accordance with the present invention may be attached to a spiral cutting tool or other hand-held power tool in the following manner. The first shaft is first attached to an end of the cutting tool motor shaft extending from the cutting tool housing, e.g., via a collet-type system. The open first end of the attachment housing is then positioned around the end of the cutting tool housing, around the location where the motor shaft emerges from the housing, by sliding the open first end of the attachment housing around the end of the cutting tool housing. In so doing, a distal end of the first shaft attached to the cutting tool motor shaft is extended into the central aperture of the first shaft alignment bearing mounted in the angle attachment housing, thereby positioning the first shaft in the angle attachment housing such that the first shaft gear mounted on the first shaft is engaged with the attachment shaft gear mounted on the attachment shaft. The fasteners mounted on the attachment housing may then be tightened to secure the angle attachment housing and, therefore, the entire angle attachment, securely on the cutting tool motor housing. An attachment, such as a cutting wheel or back-up pad having sanding disks mounted thereon, may then be mounted on the end of the attachment shaft extending from the angle attachment housing, by, for example, threading the attachment thereon in the manner described previously. The tool may then be operated for, e.g., cutting material, using the cutting wheel, or sanding material, using a sanding disk mounted on the back-up pad, by grasping the cutting tool firmly, and turning on the cutting tool motor. The rotating cutting tool motor will drive the cutting wheel or sanding disk at a high speed via the motor shaft, the first angle attachment shaft attached thereto, and the attachment shaft, mounted at an angle to the first shaft and coupled thereto via the gear mechanism. The angle with which the attachment shaft is positioned with respect to the first shaft ensures that the attachment is positioned for use in an orientation providing good visibility and control.

Further objects, features, and advantages of the invention will be apparent from the following detailed description, taken in conjunction with the accompanying drawings.

DETAILED DESCRIPTION OF THE INVENTION

Figure 1:
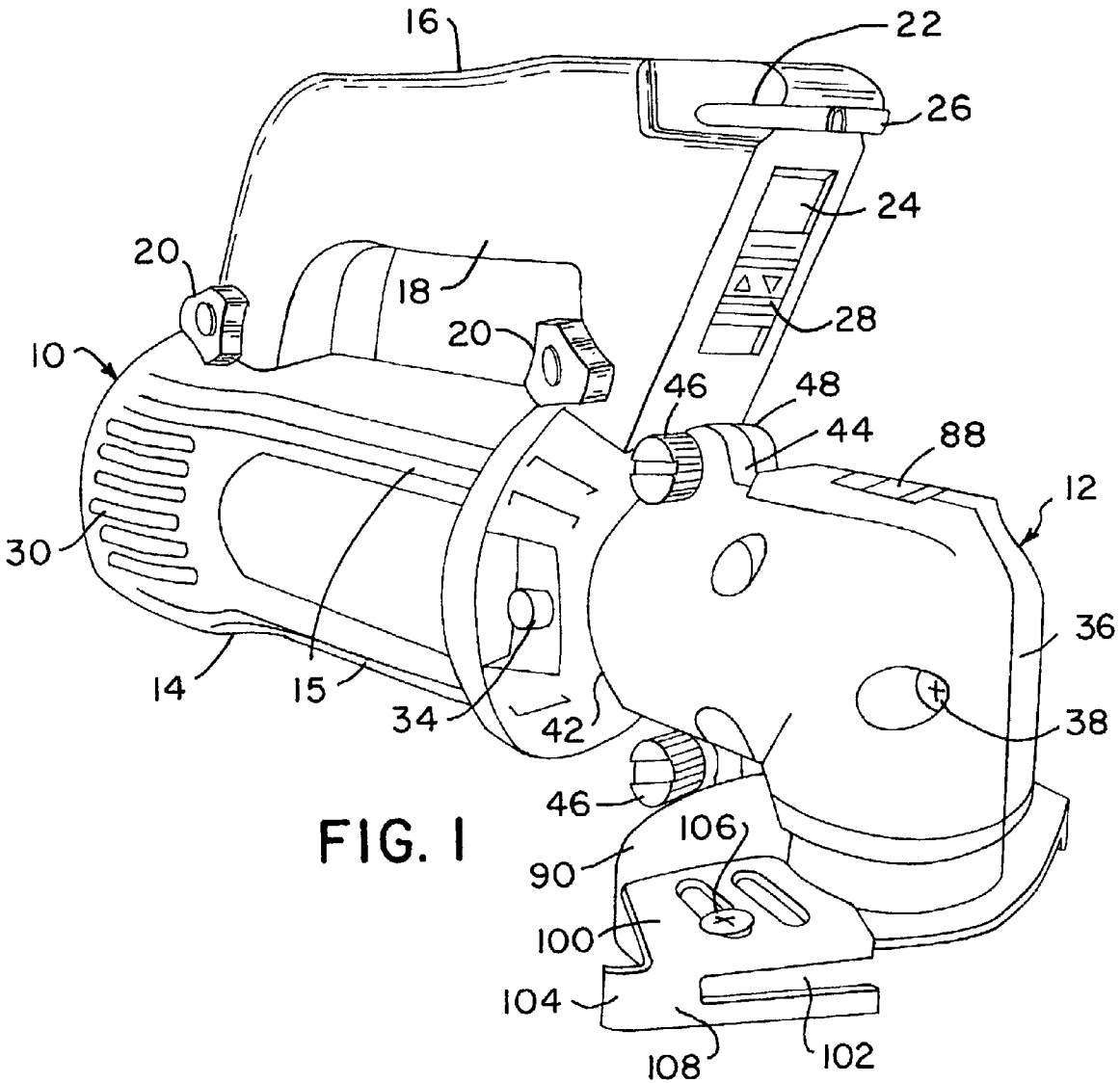
FIG. 1 is a perspective view of a spiral cutting tool having an angle attachment in accordance with the present invention attached thereto.
Figure 2:
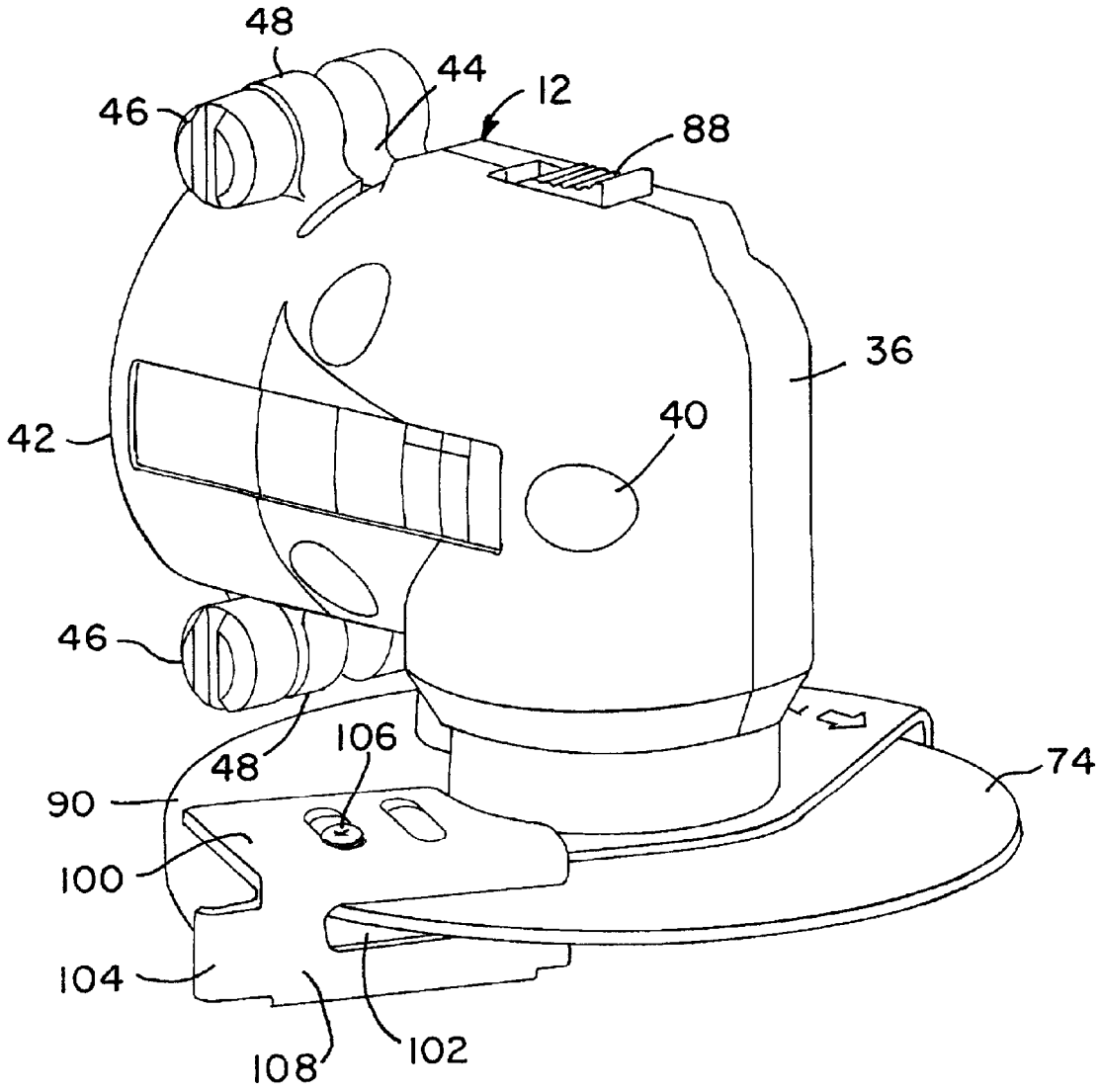
FIG. 2 is a perspective view of an exemplary angle attachment in accordance with the present invention having a cutting wheel attachment mounted thereon.
Figure 4:
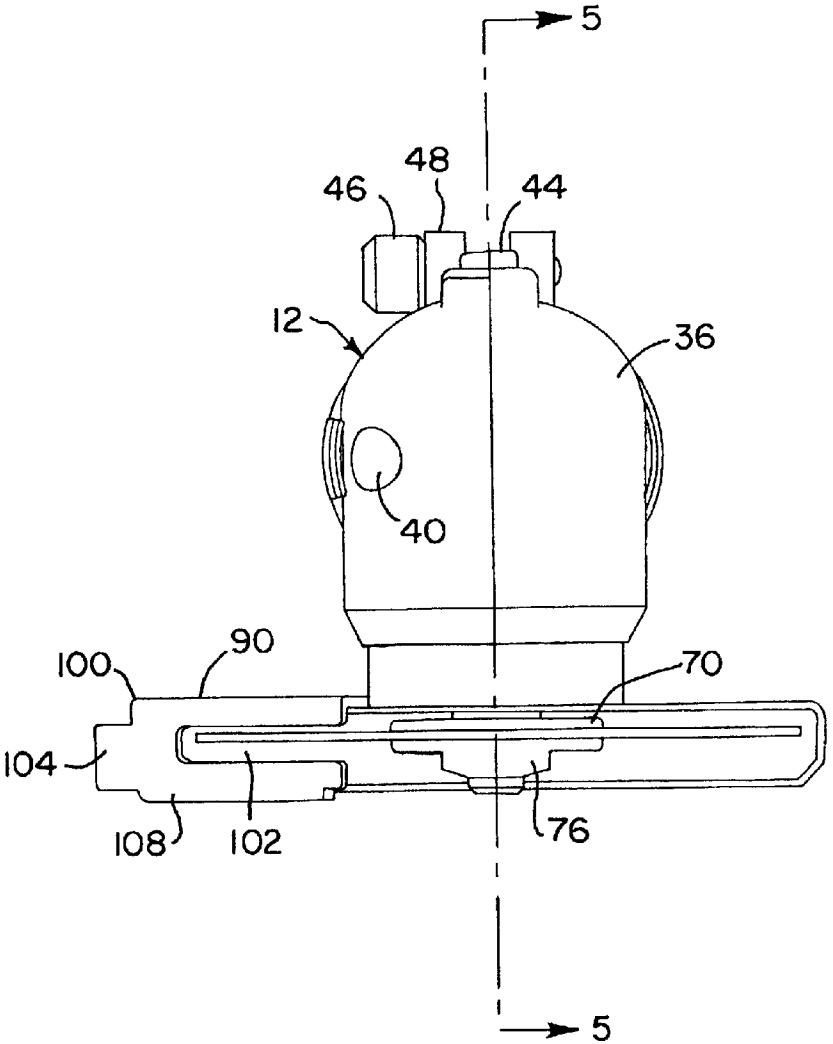
FIG. 4 is a front view of the exemplary angle attachment of FIG. 2.

A spiral cutting tool 10 having an exemplary angle attachment 12 in accordance with the present invention attached thereto is illustrated in FIG. 1. Although an exemplary angle attachment 12 in accordance with the present invention will be described in detail herein with reference to use thereof in combination with a spiral cutting tool 10, it should be understood that an angle attachment in accordance with the present invention may be employed in combination with other similar hand-held power tools as well.

The spiral cutting tool 10 includes a motor housing 14 to which the angle attachment 12 and a handle 16 are attached. The motor housing 14 is preferably made of an electrically insulating material, such as hard plastic. The motor housing 14 is generally cylindrical in shape, and includes raised gripping surfaces 15 formed thereon that allow a firm grip on the cutting tool 10 to be maintained when the cutting tool 10 is grasped around the motor housing 14.

The handle 16 is preferably made of an electrically insulating material, such as hard plastic. The handle 16 includes a gripping surface 18 which is preferably contoured in shape so that the handle 16 may be grasped comfortably in the hand of an operator of the cutting tool 10. The handle gripping surface 18 is preferably aligned substantially parallel with the axis of the cutting tool housing 14. The handle 16 allows the cutting tool 10 to be grasped firmly and comfortably with two hands, to provide greater control of the cutting tool 10 during operation, and thereby to provide for more accurate cuts with less operator fatigue. The handle 16 also allows the cutting tool 10 to be grasped more firmly during motor start-up, during which the reaction torque of the cutting tool motor may cause the tool 10 to twist. Thus, the cutting tool handle 16 also facilitates safe use of the cutting tool 10. It may be desirable, however, that the cutting tool handle 16 be detached for some applications. For example, for use of the tool 10 in close quarters or obstructed areas, the handle 16 may become an obstruction, and actually interfere with accurate use of the tool 10. Thus, the handle 16 is preferably made detachable from the cutting tool 10 when its use would interfere with accurate and safe operation of the cutting tool 10. For example, the handle 16 may be securely but detachably attached to the cutting tool 10 using threaded locking knobs 20 which are inserted through mounting holes in ends of the handle 16 into corresponding threaded holes formed in lugs (not shown) extending from the cutting tool motor housing 14. To detach the handle 16 from the housing 14, the locking knobs 20 are loosened and removed from the handle 16, and the handle 16 is pulled away from the housing 14.

One or more storage compartments 22 and 24 may be formed in the detachable handle 16. One of the handle storage compartments 22 may preferably be specifically designed to hold a wrench 26 for use in tightening and loosening a mechanical structure for attaching attachments to the spiral cutting tool 10, as will be described in more detail below. Other compartments 24 may preferably be covered by a compartment door, such as a sliding door 28, to prevent objects stored in the compartment 24 from sliding out during use of the tool 10. An exemplary and preferred detachable handle 16 which may be used in combination with the spiral cutting tool 10 is described in U.S. Pat. No. 5,813,805, the disclosure of which is incorporated herein by reference.

An electric motor (not visible in FIG. 1) is enclosed within the motor housing 14. An exemplary electric motor that may be employed is a conventional 4 amp 115–120 V, AC electric motor with a no-load rotation speed of 30,000 rpm. The motor may receive electrical power through an electrical power cord connected to an AC power source, or from a detachable battery pack mounted on the cutting tool 10 (not shown in FIG. 1). An exemplary and preferred detachable battery pack which may be used in combination with the spiral cutting tool 10 is described in U.S. Pat. No. 5,902,080, the disclosure of which is incorporated herein by reference. The electric motor is turned on and off by an on/off switch on the motor housing 14 (not shown in FIG. 1).

The electric motor of the cutting tool 10 drives a motor shaft. A fan, located within the motor housing 14, is preferably attached to the motor shaft. When the motor is turned on, by means of the on/off switch, the fan is rotated at a high speed to draw air through the motor housing 14, and across the electric motor, thereby to cool the motor. For this purpose, air intake and exhaust vents 30 are preferably provided in the motor housing 14. Cool air is thus drawn by the motor fan into the motor housing 14 through the air intake vents to cool the electric motor, with warm air exhausted from the motor housing 14 through the exhaust air vents.

Figure 3:
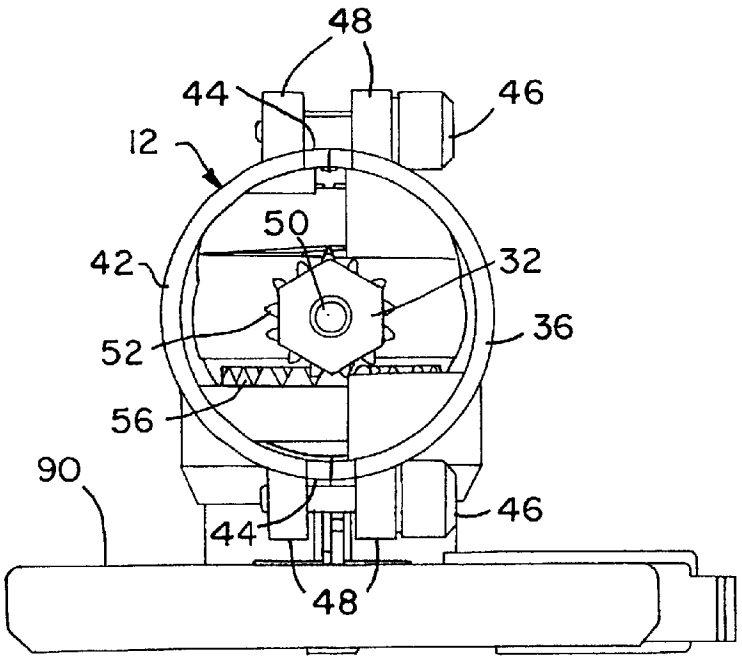
FIG. 3 is a back view of the exemplary angle attachment of FIG. 2.
Figure 5:
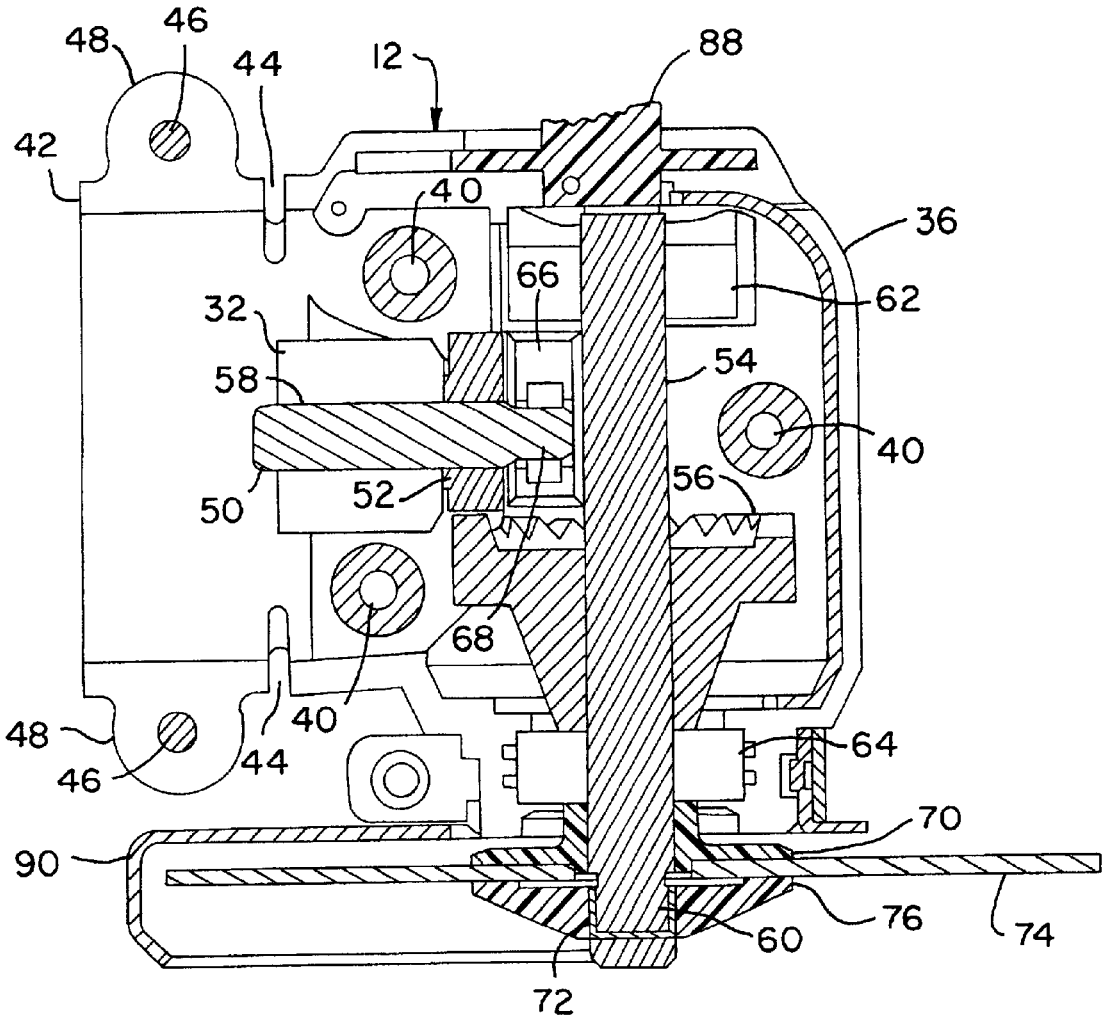
FIG. 5 is a cross-sectional view of the exemplary angle attachment of FIGS. 2–4, as taken along the line 5—5 of FIG. 4.

An end of the motor shaft extends from one end of the motor housing 14. Mounted on the end of the motor shaft is a mechanical structure 32 (see FIGS. 3, 5, and 8) for attaching attachments to the motor shaft. Although a conventional drill-type chuck may be used for the structure 32 for mechanically attaching attachments to the motor shaft, the preferred structure 32 for securing attachments to the motor shaft is a collet-type system. A collet attachment system includes a collet nut and collet centered axially within a central aperture of the collet nut. The collet nut is mounted on a threaded end of the motor shaft. To secure an attachment to the motor shaft, a shank or shaft of the attachment is inserted into the central aperture of the collet. The collet nut is then tightened, first by hand and then with a wrench, e.g., the wrench 26, until the attachment shaft or shank is housed securely. As the collet nut is tightened down on the threaded end of the motor shaft, the collet is compressed within the collet nut between a partially enclosed end of the collet nut and the motor shaft. The collet is slotted and has tapered ends such that when the collet is compressed between the collet nut and the motor shaft, the collet is compressed radially, causing the central aperture of the collet to close tightly around the shank or shaft of the attachment to be attached to the motor shaft. To remove the attachment from the motor shaft, the collet nut is loosened, e.g., using the wrench 26, until the attachment shaft can be easily removed from the central aperture of the collet.

A shaft lock pin 34 is preferably provided to prevent rotation of the motor shaft when the collet nut is being loosened and tightened. The shaft lock pin 34 extends through the motor housing 14. When the shaft lock pin 34 is depressed, it engages the motor shaft, preventing rotation of the shaft, and allowing the collet nut to be loosened and tightened. When the shaft lock pin 34 is released, a spring (not shown) attached to the shaft lock pin 34 causes the shaft lock pin 34 to become disengaged from the motor shaft, allowing free rotation thereof.

An angle attachment 12 in accordance with the present invention will now be described in further detail with reference to FIGS. 2–5. The angle attachment 12 includes an angle attachment housing 36, which contains and encloses the other components of the angle attachment 12, and by which the angle attachment 12 is attached to the housing 14 of the cutting tool 10. The angle attachment housing 36 is preferably made of an electrically insulating material, such as hard plastic. The housing 36 may be formed of such a material in two complementary and symmetric halves by a conventional molding process. The two halves are then joined together to form the complete housing 36. The two halves of the attachment housing 36 may be joined together in a conventional manner, for example, using an adhesive. The two halves of the attachment housing 36 are preferably also joined together using fasteners, such as screws 38. For this purpose, complimentary fastener holes 40 may be provided in the halves of the angle attachment housing 36.

The angle attachment housing 36 includes an open first end 42, which is adapted to receive an end of the cutting tool housing 14 located around the location where the motor shaft emerges from the housing 14, thereby to attach the angle attachment housing 36 to the cutting tool motor housing 14. One or more slots 44, or similar structures, may be formed extending inwardly from the open first end 42 of the angle attachment housing 36. For example, slots 44 preferably may be formed at two locations around the open first end 42 of the angle attachment housing 36, e.g., opposite each other across the open end 42. The slots 44, formed in the rigid or semi-rigid material of which the angle attachment housing 36 is made, permit the open first end 42 of the angle attachment housing 36 to expand slightly, thereby allowing the open first end 42 of the angle attachment housing 36 to be slid over the end of the cutting tool housing 14.

Spring force created by portions of the angle attachment housing 36 on each side of the slots 44 holds the open first end 42 of the angle attachment housing 36 on the cutting tool motor housing 14 when attached thereto. This spring force, however, is typically not sufficient to hold the angle attachment 12 in position on the cutting tool 10 during use. Therefore, a further mechanism preferably is provided for securing the open first end 42 of the angle attachment housing 36 to the cutting tool housing 14. For example, fasteners 46 may be provided to tighten the open first end 42 of the angle attachment housing 36 around the end of the cutting tool motor housing 14. The fasteners 46, which may be implemented as screws, bolts, or similar fasteners, preferably including hand or screwdriver accessible fastener ends, may, for example, be mounted in extending portions 48 of the angle attachment housing 36 positioned such that the fasteners 46 bridge the expansion slots 44 formed adjacent to the open first end 42 of the angle attachment housing 36. The extending portions 48 may be integrally formed on the angle attachment housing 36, and may preferably include threaded fastener holes formed therein, into which the fasteners 46 are threaded. As the fasteners 46 are tightened, by hand, or with a screwdriver, wrench, or other tool, the fasteners 46 draw the extending portions 48 of the angle attachment housing 36 together, thereby partially closing the slots 44 formed therein, to reduce the circumference of the open first end 42 of the angle attachment housing 36, thereby tightening the open end 42 of the angle attachment housing 36 around the end of the cutting tool motor housing 14, to attach the angle attachment housing 36 securely thereto.

Within the angle attachment housing 36 there is positioned a first shaft 50, upon which a first shaft gear 52 is mounted, and an attachment shaft 54, upon which an attachment shaft gear 56 is mounted. (See, e.g., FIG. 5.) The first shaft gear 52 and attachment shaft gear 56 may be fixedly attached to the first shaft 50 and attachment shaft 54, respectively, in a conventional manner. The first shaft 50, first shaft gear 52, attachment shaft 54, and attachment shaft gear 56, may be made in a conventional manner of strong wear resistant materials, e.g., steel.

The first shaft 50 and attachment shaft 54 are positioned in the angle attachment housing 36 such that a proximal end 58 of the first shaft 50 extends toward the open first end 42 of the angle attachment housing 36 along an axis thereof, such that the attachment shaft 54 is mounted at an angle, e.g., a right angle, to the first shaft 50 and an attachment end 60 thereof extends from a second end of the angle attachment housing 36, and such that the first shaft gear 52 mounted on the first shaft 50 is engaged with the attachment shaft gear 56 mounted on the attachment shaft 54. In this manner, rotation of the first shaft 50 is translated to rotation of the attachment shaft 54, mounted at an angle thereto, via the gears 52 and 56, thereby to rotate an attachment, such as a cutting wheel or back-up pad for a sanding disk, attached to the attachment end 60 of the attachment shaft 54, in a manner to be described in more detail below.

The attachment shaft 54 is preferably mounted for rotational movement in a fixed axial position in the angle attachment housing 36. At least one bearing assembly 62 or 64 is preferably fixedly mounted in the angle attachment housing 36 around the attachment shaft 54 to provide rotational bearing support for the attachment shaft 54. Preferably two bearing assemblies 62 and 64 are employed, with each bearing assembly 62 and 64 mounted in the angle attachment housing 36 in a conventional manner and one bearing assembly 62 or 64 positioned along the attachment shaft 54 on each side of the attachment shaft gear 56, i.e., on each side of the position where the first shaft gear 52 engages the attachment shaft gear 56. The bearing assemblies 62 and 64 may be implemented in a conventional manner, e.g., as ball bearing assemblies.

The first shaft 50, having the first gear 52 mounted thereon, is preferably removably mounted in the angle attachment housing 36. This allows the first shaft 50 to be attached to the end of the cutting tool motor shaft, by means of the mechanical structure 32 mounted thereon for this purpose, before the angle attachment 12 is attached to the cutting tool 10. To ensure proper operation of an angle attachment 12 in accordance with the present invention, the first shaft 50, attached to the motor shaft, must be positioned and remain in proper alignment with the attachment shaft 54, such that the gears 52 and 56 mounted on the first shaft 50 and the attachment shaft 54, respectively, remain engaged during operation. This is particularly important where the angle attachment 12 is used as an attachment for a spiral cutting tool, having a very high motor rotation speed.

In accordance with the present invention, proper alignment between the first shaft 50 and the attachment shaft 54 is established and maintained by an alignment bearing 66. The alignment bearing 66 may be implemented in a conventional manner, e.g., as a ball bearing assembly, and is mounted in a fixed position in the angle attachment housing 36 in a conventional manner. The alignment bearing assembly 66 is positioned in the angle attachment housing 36 such that, when the first shaft 50 is supported thereby for rotational movement thereof, the attachment shaft 54 is positioned at the desired angle with respect to the first shaft 50, and the gears 52 and 56 remain engaged.

The first shaft 50 preferably includes a distal end 68 which extends beyond the position of the first shaft gear 52 mounted on the first shaft 50. The distal end 68 of the first shaft 50 may have a smaller circumference than the remainder of the first shaft 50. The distal end 68 is sized and shaped to be inserted into, and supported by, the alignment bearing assembly 66. For example, the distal end 68 of the first shaft 50 may be sized and shaped to fit into a central aperture of the alignment bearing assembly 66.

An angle attachment 12 in accordance with the present invention may be employed in combination with various attachments which are attached to the end 60 of the attachment shaft 54 which extends from the angle attachment housing 36. An attachment mounting structure is preferably formed at the end 60 of the attachment shaft 54 to provide a means for attaching various attachments thereto. For example, an attachment flange 70 may be fixedly mounted on the end 60 of the attachment shaft 54, around the attachment shaft 54 where the attachment shaft 54 emerges from the angle attachment housing 36. A portion 72 of the end 60 of the attachment shaft 54 extends beyond the attachment flange 70. This portion 72 of the attachment shaft 54 is preferably at least partially threaded.

An attachment, such as, for example, a cutting wheel 74, may be attached to the attachment shaft 54 by, for example, placing the cutting wheel 74 against the mounting flange 70, with the threaded portion 72 of the attachment shaft 54 extending through a central aperture formed in the cutting wheel 74. A flange nut 76 may then be threaded over the threaded portion 72 of the attachment shaft 54, and tightened down against the cutting wheel 74, to press the cutting wheel 74 tightly against the attachment flange 70, thereby attaching the cutting wheel 74 securely to the attachment shaft 54. The cutting wheel 74 may be removed from the attachment shaft 54 by loosening the flange nut 76, removing the flange nut 76 from the threaded end 72 of the attachment shaft 54, and then removing the cutting wheel 74 from the end 60 of the attachment shaft 54.

Figure 6:
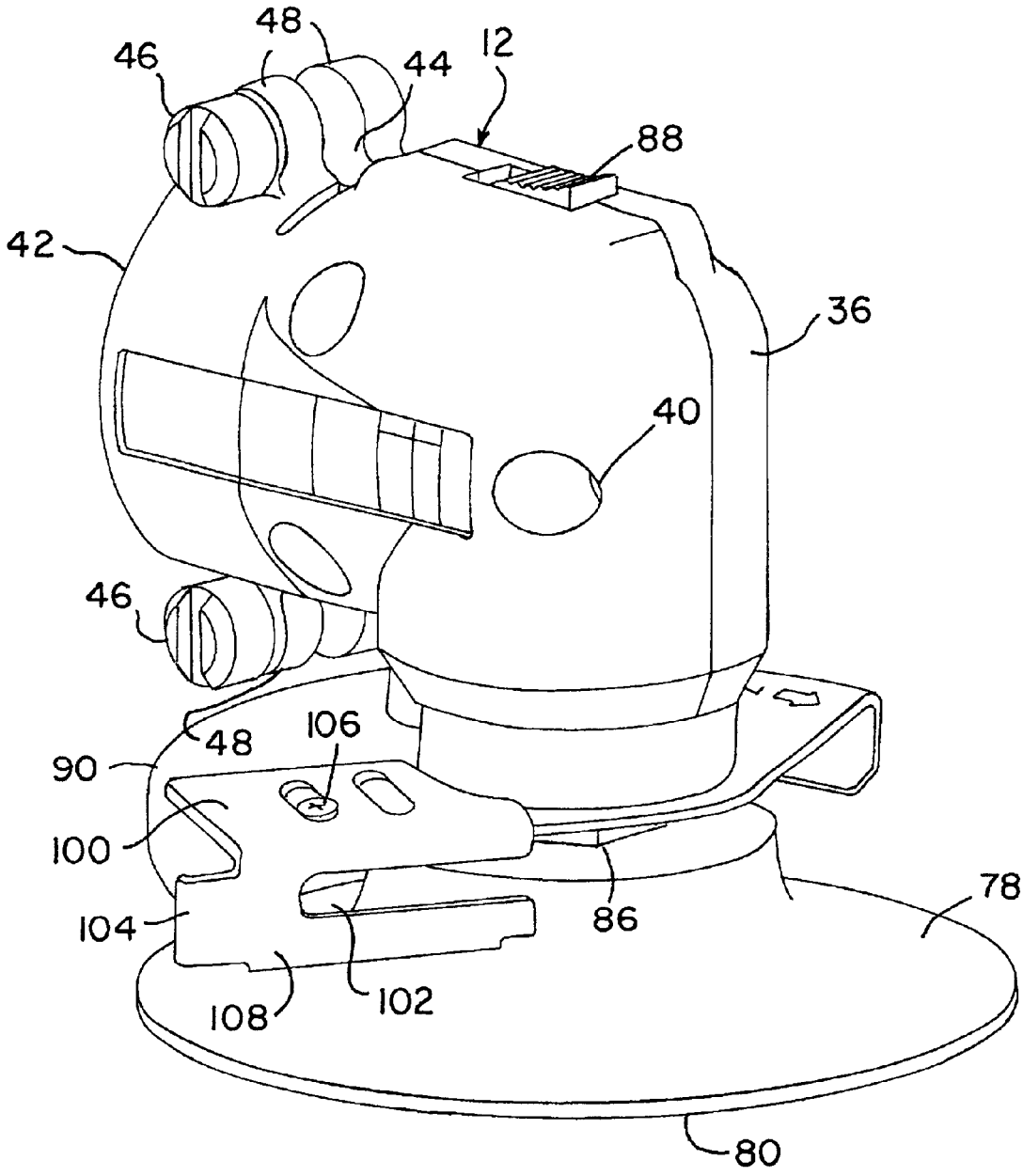
FIG. 6 is a perspective view of an exemplary angle attachment in accordance with the present invention having a back-up pad attachment for supporting sanding disks mounted thereon.
Figure 8:
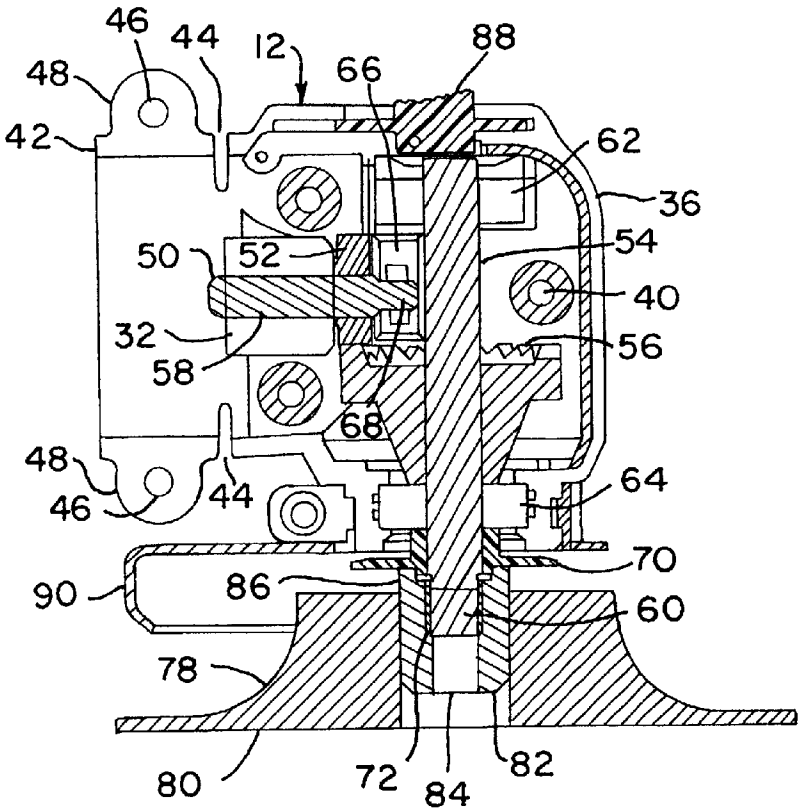
FIG. 8 is a cross-sectional view of the exemplary angle attachment of FIGS. 6 and 7, as taken along the line 8—8 of FIG. 7.
Figure 7:
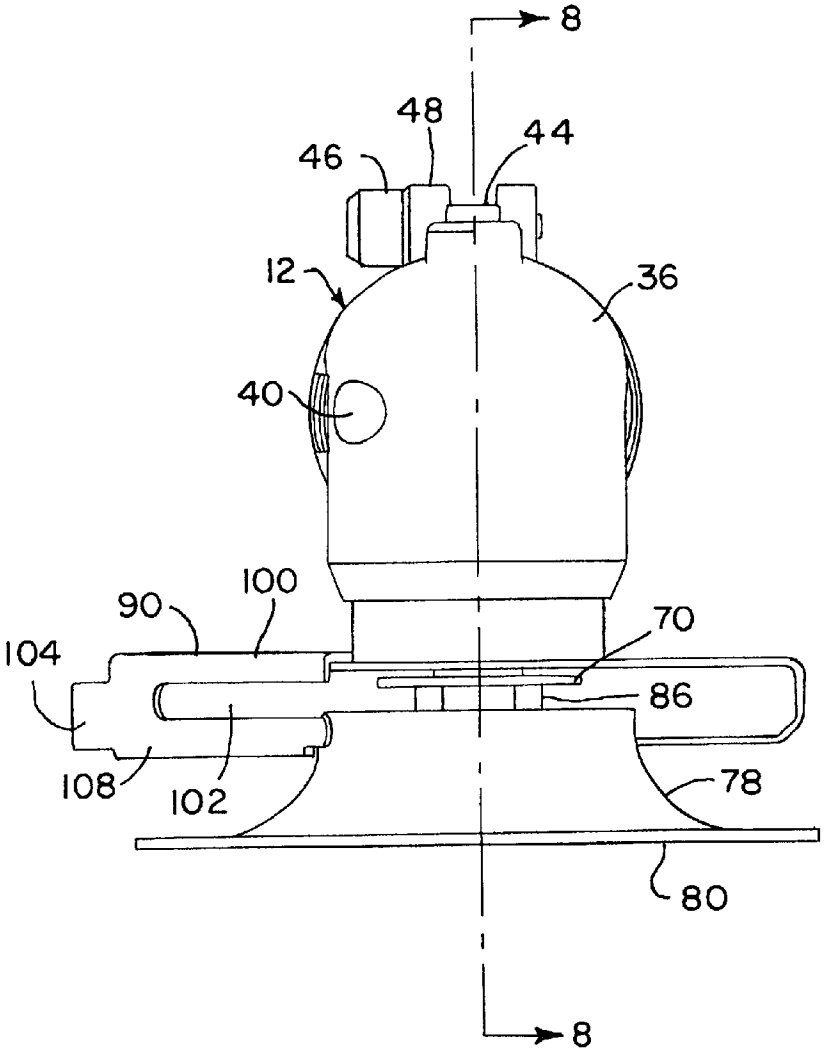
FIG. 7 is a front view of the exemplary angle attachment of FIG. 6.

An angle attachment 12 in accordance with the present invention may be employed for sanding operations by attaching a sanding disk back-up pad 78 to the end 60 of the attachment shaft 54, as illustrated, for example, in FIGS. 6–8. The back-up pad 78 has a bottom surface 80, to which sanding disks may be attached, in a conventional manner, e.g., using an adhesive. The back-up pad 78 preferably includes a mounting structure 82 positioned centrally thereon. The mounting structure 82 preferably includes a threaded central aperture 84. The threaded central aperture 84 of the back-up pad mounting structure 82 may be threaded onto the threaded end 72 of the attachment shaft 54. The back-up pad 78 may be tightened against the attachment shaft flange 70, thereby to attach the back-up pad 78 to the end 60 of the attachment shaft 54. The back-up pad mounting structure 82 preferably includes a hex nut 86 or similar configuration which facilitates tightening the back-up pad attachment 78 onto the attachment shaft 54 using a wrench or other similar tool.

Means preferably are provided for temporarily preventing rotation of the attachment shaft 54 to facilitate the attachment of attachments thereto, and the removal of attachments therefrom. When the angle attachment 12 is attached to the spiral cutting tool 10, rotation of the attachment shaft 54 may be prevented, temporarily, when attachments are being attached thereto or removed therefrom, by depressing the shaft lock pin 34 on the spiral cutting tool 10. As described previously, when the shaft lock pin 34 is depressed, it engages the spiral cutting tool motor shaft, preventing rotation of the shaft. Since the spiral cutting tool motor shaft is coupled to the attachment shaft 54, via the first shaft 50, the first shaft gear 52, and the attachment shaft gear 56, depressing the shaft lock pin 34 when the angle attachment 12 is attached to the spiral cutting tool 10 also prevents rotation of the attachment shaft 54. When the shaft lock pin 34 is released, the shaft lock pin 34 becomes disengaged from the motor shaft, allowing free rotation thereof, as well as free rotation of the attachment shaft 54.

It may be desirable to attach attachments to the attachment shaft 54, or remove attachments therefrom, when the angle attachment 12 is not attached to the spiral cutting tool 10. To facilitate the attachment of attachments to the attachment shaft 54, and the removal of attachments therefrom, when the angle attachment 12 is not attached to the spiral cutting tool 10, an attachment shaft lock mechanism 88 is preferably provided on the angle attachment 12. The attachment shaft lock 88 may be implemented in a conventional manner to engage the attachment shaft 54 when depressed or moved, thereby preventing rotation of the shaft 54, and allowing attachments to be attached to or removed from the end 60 thereof. A spring release (not shown) is preferably provided to cause the attachment shaft lock mechanism 88 to become automatically disengaged from the attachment shaft 54, allowing free rotation thereof, when the attachment shaft lock mechanism 88 is not operated.

For safety purposes, a safety guard 90 is preferably provided on the angle attachment 12. The safety guard 90 may be implemented in a conventional manner, and is attached to the angle attachment 12 on the second end of the angle attachment housing 36, where the attachment shaft 54 emerges from the angle attachment housing 36, and where various attachments are attached thereto. The safety guard 90 is positioned on the angle attachment housing 36 such that if an operator's hand grasping the motor housing 14 of a spiral cutting tool 10 to which the angle attachment 12 is attached slips forward along the motor housing 14, the hand is prevented from contacting an attachment, such as a cutting wheel 74, attached to the end 60 of the attachment shaft 54, by the safety guard 90.

An angle attachment 12 is accordance with the present invention may be attached to a spiral cutting tool 10, or other hand-held power tool, and employed for a cutting or sanding operation in the following manner. With the spiral cutting tool 10 turned off, and disconnected from a power source, the proximal end 58 of the first shaft 50 is inserted into the structure 32, e.g., the collet-type system, mounted on the end of the motor shaft of the spiral cutting tool 10. The spiral cutting tool shaft lock button 34 is depressed, to temporarily prevent rotation of the motor shaft, and the attachment structure 32 is tightened, e.g., using the wrench 26, to securely attach the first shaft 50 to the motor shaft. The shaft lock button 34 may then be released. The open first end 42 of the angle attachment housing 36 is then positioned around the end of the cutting tool motor housing 14, around the location where the motor shaft emerges from the housing 14, by sliding the open first end 42 of the angle attachment housing 36 around the end of the cutting tool housing 14. In so doing, the distal end 68 of the first shaft 50 is extended into the central aperture of the alignment bearing 66 mounted in the angle attachment housing 36, thereby positioning the first shaft 50 in the angle attachment housing 36 such that the first shaft gear 52 engages the attachment shaft gear 56 mounted on the attachment shaft 54. The fasteners 46 mounted on the angle attachment housing 36 may then be tightened to secure the angle attachment housing 36 and, therefore, the entire angle attachment 12, securely on the cutting tool motor housing 14. An attachment, such as a cutting wheel 74 or back-up pad 78 having sanding disks mounted thereon, may then be mounted on the end 60 of the attachment shaft 54 extending from the angle attachment housing 36 in the manner described previously by, for example, threading the attachment thereon while depressing the shaft lock pin 34 temporarily to prevent rotation of the attachment shaft 54. The spiral cutting tool 10 may then be operated for, e.g., cutting material, using the cutting wheel 74, or sanding material, using a sanding disk mounted on the back-up pad 78, by grasping the cutting tool 10 firmly, and turning on the cutting tool motor. The rotating cutting tool motor will drive the cutting wheel or sanding disk at a high speed via the motor shaft, the first shaft 50 attached thereto, and the attachment shaft 54, mounted at an angle to the first shaft 50, and coupled thereto via the first shaft gear 52 and the attachment shaft gear 56. The angle with which the attachment shaft 54 is positioned with respect to the first shaft 50 ensures that the attachment is positioned for use in an orientation providing good visibility and control.

The safety guard 90 may preferably include an adjustable foot 100 attached thereto. The adjustable foot 100 includes a slot 102 formed therein. A cutting wheel 74, when mounted on the angle attachment 12, extends through the slot 102. A leading edge 104 of the foot 100 may be curved backward slightly. The foot 100 may be attached to the safety guard 90 by a screw 106 or other fastener which allows the position of the foot 100 to be adjusted. The foot 100 may thus be positioned such that the depth of a cut made by a cutting wheel 74 mounted on the angle attachment 12 may be adjusted when a cut is made by placing a face 108 of the foot 100 along a workpiece being cut.

It should be understood that the present invention is not confined to the particular exemplary embodiments or applications herein illustrated and described, but embraces such modified forms thereof as come within the scope of the following claims.

What is claimed is:

1. A removable angle attachment for a power tool, comprising:

(*a*) an angle attachment housing;

(b) an attachment shaft [mounted] *provided* in the angle attachment housing [and having an attachment end extending therefrom];

(c) [a first] *an* attachment shaft bearing [mounted] *provided* in the angle attachment housing and [positioned therein] *configured* to support the attachment shaft for rotational movement thereof;

(d) an attachment shaft gear attached to the attachment shaft; and (e) an alignment bearing [mounted] *positioned* in the angle attachment housing and adapted to removably receive a distal end of a first shaft having a first shaft gear mounted thereon to support the first shaft for rotational movement thereof and positioned in the angle attachment housing such that when the first shaft is positioned in the alignment bearing the attachment shaft is at an angle to the first shaft and the attachment shaft gear is engaged with the first shaft gear.

2. The angle attachment of claim 1 wherein the angle attachment housing includes an open first end and wherein the alignment bearing is mounted in the angle attachment housing in alignment with an axis of the open first end of the angle attachment housing.

3. An angle attachment for a power tool, comprising:

(a) an angle attachment housing including an open first end [and wherein the open first end of the angle attachment housing is sized and shaped] *adapted* to fit around a portion of a [motor] housing of a power tool and further including means for securing the open first end of the angle attachment housing to the [motor] housing of the power tool;

(b) an attachment shaft mounted in the angle attachment housing and having an attachment end extending therefrom;

(c) a first attachment shaft bearing mounted in the angle attachment housing and positioned therein to support the attachment shaft for rotational movement thereof;

(d) an attachment shaft gear attached to the attachment shaft; and (e) an alignment bearing mounted in the angle attachment housing in alignment with an axis of the open first end of the angle attachment housing and adapted to receive a first shaft having a first shaft gear mounted thereon to support the first shaft for rotational movement thereof and positioned in the angle attachment housing such that when the first shaft is positioned in the alignment bearing the attachment shaft is at an angle to the first shaft and the attachment shaft gear is engaged with the first shaft gear.

4. The angle attachment of claim 3 wherein the means for securing the open first end of the angle attachment housing to the [motor] housing of the power tool includes at least one slot formed in the angle attachment housing [and extending from] *adjacent to* the open first end thereof and a fastener mounted on the angle attachment housing [and extending across the slot such that when the fastener is tightened the slot is pulled closed to thereby reduce the circumference of the open first end of the angle attachment housing to secure the open first end of the angle attachment housing to the portion of the motor housing].

5. The angle attachment of claim 1 wherein the attachment end of the attachment shaft is adapted to have tool attachments attached thereto.

6. The angle attachment of claim 5 wherein the attachment end of the attachment shaft is threaded.

7. An angle attachment for a power tool, comprising:

(a) [an angle attachment] *a* housing[:]*;*

(b) an attachment shaft mounted in the [angle attachment] housing and having a threaded attachment end extending therefrom and an attachment shaft flange mounted on the attachment end of the attachment shaft and positioned thereon such that the threaded attachment end of the attachment shaft extends beyond the attachment shaft flange;

(c) a first attachment shaft bearing mounted in the [angle attachment] housing [and positioned therein] to support the attachment shaft for rotational movement thereof;

(d) [an attachment shaft] *a* gear attached to the attachment shaft; and (e) an alignment bearing mounted in the [angle attachment] housing and adapted to receive a first shaft having a first shaft gear mounted thereon to support the first shaft for rotational movement [thereof and positioned in the angle attachment housing such that]*; wherein* when the first shaft is positioned in the alignment bearing the attachment shaft is at an angle to the first shaft and the attachment shaft gear is engaged with the first shaft gear.

8. An angle attachment for a power tool, comprising:

(a) an angle attachment housing;

(b) an attachment shaft mounted in the angle attachment housing and having an attachment end extending therefrom;

(c) an attachment shaft gear attached to the attachment shaft;

(d) a first attachment shaft bearing mounted in the angle attachment housing and positioned therein on a first side of the attachment shaft gear [mounted on the attachment shaft] to support the attachment shaft for rotational movement thereof;

(e) a second attachment shaft bearing mounted in the angle attachment housing and positioned therein on a second side of the attachment shaft gear [mounted on the attachment shaft] to support the attachment shaft for rotational movement thereof in the angle attachment housing; and (f) an alignment bearing mounted in the angle attachment housing and adapted to receive a first shaft having a first shaft gear mounted thereon to support the first shaft for rotational movement thereof and positioned in the angle attachment housing such that when the first shaft is positioned in the alignment bearing the attachment shaft is at an angle to the first shaft and the attachment shaft gear is engaged with the first shaft gear.

9. The angle attachment of claim 1 wherein the alignment bearing is positioned in the angle attachment housing such that when the first shaft is positioned in the alignment bearing the attachment shaft is at a right angle to the first shaft.

10. An angle attachment for a power tool, comprising:

(a) [an angle attachment] *a* housing;

(b) an attachment shaft mounted in the [angle attachment] housing and having an attachment end extending [therefrom] *from the housing*;

(c) a first attachment shaft bearing mounted in the [angle attachment] housing and positioned therein to support the attachment shaft for rotational movement thereof;

(d) an attachment shaft gear attached to the attachment shaft;

(e) an alignment bearing [mounted] *provided* in the [angle attachment] housing and adapted to receive an first shaft having a first shaft gear mounted thereon to support the first shaft for rotational movement thereof and positioned in the [angle attachment] housing such that when the first shaft is positioned in the alignment bearing the attachment shaft is at an angle to the first shaft and the attachment shaft gear is engaged with the first shaft gear; and (f) a first shaft having a first shaft gear mounted thereon positioned in the alignment bearing.

11. The angle attachment of claim 10 wherein the first shaft includes a proximal end and a distal end, wherein the first shaft gear is mounted on the first shaft between the proximal and distal ends thereof and positioned thereon such that when the distal end of the fist shaft is positioned in the alignment bearing the first shaft gear engages the attachment shaft gear, and where in the distal end of the first shaft is positioned in the alignment bearing.

12. The angle attachment of claim 11 wherein the distal end of the first shaft is smaller in circumference than the proximal end thereof.

13. The angle attachment of claim 1 comprising additionally attachment shaft lock means for preventing rotation of the attachment shaft.

14. An angle attachment for a power tool having a motor housing, a motor located within the motor housing, a motor shaft driven by the motor and having a motor shaft end [ex tending] *extending* from the motor housing, and a mechanical structure attached to the motor shaft end for securing attachments to the motor shaft, *the angle attachment* comprising:

(a) an angle attachment housing having an open first end thereof attached to the motor housing around a location where the motor shaft extends from the motor housing;

(b) an attachment shaft mounted in the angle attachment housing and having an attachment end extending from a second end thereof;

(c) a first attachment shaft bearing mounted in the angle attachment housing and positioned therein to support the attachment shaft for rotational movement thereof;

(d) an attachment shaft gear attached to the attachment shaft;

(e) an alignment bearing mounted in the angle attachment housing;

(f) a first shaft attached to the motor shaft via the mechanical structure and removably positioned in the alignment bearing at an angle to the attachment shaft to be supported by the alignment bearing for rotational movement thereof; and (g) a first shaft gear mounted on the first shaft and engaged with the attachment shaft gear.

15. The angle attachment of claim 14 wherein the alignment bearing is mounted in the angle attachment housing in alignment with an axis of the open first end of the angle attachment housing.

16. The angle attachment of claim 14 further comprising means for securing the open first end of the angle attachment housing to the motor housing of the power tool.

17. The angle attachment of claim 16 wherein the means for securing the open first end of the angle attachment housing to the motor housing of the power tool includes at least one slot formed in the angle attachment housing [and extending from] *adjacent to* the open first end thereof and a fastener mounted on the angle attachment housing and extending across the slot such that when the fastener is tightened the slot is pulled closed to thereby reduce the circumference of the open first end of the angle attachment housing to secure the open first end of the angle attachment housing to the motor housing.

18. The angle attachment of claim 14 wherein the attachment end of the attachment shaft is adapted to have tool attachments attached thereto.

19. The angle attachment of claim 18 wherein the attachment end of the attachment shaft is threaded.

20. The angle attachment of claim 19 comprising additionally an attachment shaft flange mounted on the attachment end of the attachment shaft and positioned thereon such that a threaded portion of the attachment end of the attachment shaft extends beyond the attachment shaft flange.

21. The angle attachment of claim 14 wherein the first attachment shaft bearing is positioned in the angle attachment housing on a first side of the attachment shaft gear mounted on the attachment shaft and comprising additionally a second attachment shaft bearing mounted in the angle attachment housing and positioned therein on a second side of the attachment shaft gear mounted on the attachment shaft to support the attachment shaft for rotational movement thereof in the angle attachment housing.

22. The angle attachment of claim 14 wherein the first shaft is positioned in the alignment bearing at a right angle to the attachment shaft.

23. The angle attachment of claim 14 wherein the first shaft includes a proximal end and a distal end, wherein the first shaft gear is mounted on the first shaft between the proximal and distal ends thereof and positioned thereon such that when the distal end of the fist shaft is positioned in the alignment bearing the first shaft gear engages the attachment shaft gear, and wherein the distal end of the first shaft is positioned in the alignment bearing.

24. The angle attachment of claim 23 wherein the distal end of the first shaft is smaller in circumference than the proximal end thereof.

25. The angle attachment of claim 1 comprising additionally attachment shaft lock means for preventing rotation of the attachment shaft.

*26. A hand-held power tool adapted for use in a first arrangement as a rotary cutting tool and in a second arrangement with an angle attachment mounted thereto, the tool comprising:*

*a housing having a first end;*

*a motor provided inside the housing;*

*a motor shaft having a first end coupled to the motor and a second end extending from the first end of the housing;*

*a collet nut selectively mounted to the second end of the motor shaft;*

*a collet selectively received inside the collet nut;*

*the tool being adapted in a first arrangement to support a rotary tool bit in the collet nut and collet when the tool is adapted for use as a rotary cutting tool;*

*the tool being adapted in a second arrangement to couple to an angle attachment, the angle attachment comprising:*

*an angle attachment housing, the angle attachment housing having a first end adapted for mounting to the first end of the motor housing;*

*a first shaft provided in the angle attachment housing and adapted to be selectively coupled to the motor shaft; and*

*an attachment shaft provided in the angle attachment housing so that the attachment shaft is not substantially parallel to the motor shaft, the attachment shaft being coupled to the first shaft to translate rotation of the first shaft into rotation of the attachment shaft;*

*wherein the attachment shaft has an attachment end extending from the angle attachment housing that is adapted to support a variety of attachments comprising cutting wheels and sanding discs.*

*27. A hand-held power tool according to claim 26 and further comprising a bearing provided in the angle attachment housing, the bearing being adapted to support the attachment shaft for rotational movement.*

*28. A hand-held power tool according to claim 27 and further comprising an attachment shaft gear attached to the attachment shaft.*

*29. A hand-held power tool according to claim 28 and further comprising a first shaft gear provided on the first shaft, the first shaft gear and attachment shaft gear being engaged to translate rotational movement of the first shaft to the attachment shaft.*

*30. A hand-held power tool according to claim 29 and further comprising an alignment bearing provided in the angle attachment housing, the alignment bearing being adapted to removably receive a distal end of the first shaft and to support the first shaft for rotational movement within the angle attachment housing.*

*31. A hand-held power tool according to claim 26 and further comprising an alignment bearing provided in the angle attachment housing, the alignment bearing being adapted to removably receive a distal end of the first shaft and support the first shaft for rotational movement within the angle attachment housing.*

*32. A hand-held power tool according to claim 31 and further comprising an attachment shaft gear attached to the attachment shaft.*

*33. A hand-held power tool according to claim 32 and further comprising a first shaft gear provided on the first shaft, the first shaft gear and attachment shaft gear being engaged to translate rotational movement of the first shaft to the attachment shaft.*

*34. A hand-held power tool according to claim 33 and further comprising a bearing provided in the angle attachment housing, the bearing being adapted to support the attachment shaft for rotational movement.*

*35. A hand-held power tool according to claim 26, wherein the first end of the angle attachment housing is mounted to the first end of the motor housing through the cooperation of at least one slot formed in the angle attachment housing and a fastener provided on the angle attachment housing so that when the fastener is tightened, the slot is pulled closed to secure the open first end of the angle attachment housing to the first end of the motor housing.*

*36. A hand-held power tool according to claim 26, wherein the attachment end of the attachment shaft is threaded.*

* * * * *